(12) United States Patent
Byun

(10) Patent No.: US 9,475,407 B2
(45) Date of Patent: Oct. 25, 2016

(54) FOLDING VEHICLE SEAT

(71) Applicant: HYUNDAI MOTOR COMPANY, Seoul (KR)

(72) Inventor: Ji Soo Byun, Gwangju-si (KR)

(73) Assignee: HYUNDAI MOTOR COMPANY, Seoul (KR)

( * ) Notice: Subject to any disclaimer, the term of this patent is extended or adjusted under 35 U.S.C. 154(b) by 8 days.

(21) Appl. No.: 14/621,790

(22) Filed: Feb. 13, 2015

(65) Prior Publication Data

US 2016/0107544 A1    Apr. 21, 2016

(30) Foreign Application Priority Data

Oct. 17, 2014 (KR) .................. 10-2014-0141017

(51) Int. Cl.
*A47C 15/00* (2006.01)
*B60N 2/06* (2006.01)
(Continued)

(52) U.S. Cl.
CPC .............. *B60N 2/062* (2013.01); *B60N 2/01* (2013.01); *B60N 2/0862* (2013.01); *B60N 2/1635* (2013.01); *B60N 2/0292* (2013.01); *B60N 2/24* (2013.01); *B60N 2/3002* (2013.01);
(Continued)

(58) Field of Classification Search
CPC .............. B64D 11/06; B64D 11/0601; B64D 11/0693; B60N 2/0292; B60N 2/3025; B60N 2/3002; B60N 2/3059; B60N 2/062; B60N 2/01; B60N 2/24; B60N 2/305; B60N 2/304; B60N 2/433; B60N 2/3011; B60N 2/43

USPC ........... 297/236, 248, 234, 337, 353, 354.1; 296/65.09
See application file for complete search history.

(56) References Cited

U.S. PATENT DOCUMENTS

| 5,456,518 A | * | 10/1995 | Kemppainen ......... A47C 1/126 297/232 |
| 5,662,368 A | * | 9/1997 | Ito ..................... B60N 2/01583 248/503.1 |

(Continued)

FOREIGN PATENT DOCUMENTS

| JP | 57-127030 U | 8/1982 |
| KR | 20-1992-0016567 Y1 | 9/1992 |

(Continued)

OTHER PUBLICATIONS

Korean Office Action issued in Korean Application No. 10-2014-0141017 dated Sep. 23, 2015.
(Continued)

*Primary Examiner* — Chi Q Nguyen
(74) *Attorney, Agent, or Firm* — McDermott Will & Emery LLP

(57) ABSTRACT

A folding vehicle seat includes a sliding rail having a predetermined length installed on a floor of a vehicle. A leg unit is seated on the sliding rail such that the leg unit slides along the sliding rail. A lifting device has a seat cushion on which a passenger sits and is mounted on the leg unit such that the lifting device moves upward and downward, thereby moving the seat cushion upward and downward. A locking device is mounted on the leg unit such that the locking device is connected to both the sliding rail and the lifting device and allows either sliding movement of the leg unit along the sliding rail or upward and downward movement of the lifting device.

14 Claims, 8 Drawing Sheets

(51) Int. Cl.
*B60N 2/01* (2006.01)
*B60N 2/08* (2006.01)
*B60N 2/16* (2006.01)
B60N 2/02 (2006.01)
B60N 2/30 (2006.01)
B60N 2/24 (2006.01)
B64D 11/06 (2006.01)
B60N 2/433 (2006.01)
B60N 2/42 (2006.01)

(52) U.S. Cl.
CPC .............. *B60N 2/304* (2013.01); *B60N 2/305* (2013.01); *B60N 2/3025* (2013.01); *B60N 2/3059* (2013.01); *B60N 2/43* (2013.01); *B60N 2/433* (2013.01); *B64D 11/06* (2013.01); *B64D 11/0601* (2014.12); *B64D 11/0693* (2013.01)

(56) References Cited

U.S. PATENT DOCUMENTS

| | | | | |
|---|---|---|---|---|
| 6,106,060 A * | 8/2000 | Staehlin | ................ | A47C 1/121 297/234 |
| 6,196,610 B1 * | 3/2001 | Pesta | ................ | B60N 2/01583 296/65.01 |
| 6,460,929 B2 * | 10/2002 | Kamida | ............... | B60N 2/3006 296/65.11 |
| 6,595,587 B2 * | 7/2003 | Konishi | ............... | B60N 2/3013 296/65.01 |
| 7,748,766 B2 * | 7/2010 | Villeminey | ............ | B60N 2/065 296/64 |
| 7,753,428 B2 * | 7/2010 | Kato | .................... | B60N 2/3011 296/65.08 |
| 7,980,618 B2 * | 7/2011 | Kato | .................. | B60N 2/01508 296/24.34 |
| 8,282,150 B2 * | 10/2012 | Clor | .................... | B60N 2/3011 296/65.09 |
| 2009/0243325 A1 * | 10/2009 | Villeminey | ............ | B60N 2/065 296/65.09 |
| 2010/0052390 A1 * | 3/2010 | Dagcioglu | ........... | B60N 2/3011 297/324 |
| 2011/0193388 A1 * | 8/2011 | Ventura | .................. | B60N 2/206 297/341 |
| 2013/0038103 A1 | 2/2013 | Scott | | |

FOREIGN PATENT DOCUMENTS

| | | |
|---|---|---|
| KR | 95-0006204 Y1 | 8/1995 |
| KR | 10-1998-057165 A | 9/1998 |
| KR | 10-2004-0048010 A | 6/2004 |
| KR | 10-2004-0099931 A | 12/2004 |
| KR | 20-2011-0011648 U | 12/2011 |

OTHER PUBLICATIONS

Korean Notice of Allowance issued in Korean Application No. 10-2014-0141017 dated Jan. 4, 2016.

* cited by examiner

FOLDING VEHICLE SEAT

CROSS REFERENCE TO RELATED APPLICATION(S)

The present application claims the benefit of priority to Korean Patent Application No. 10-2014-0141017, filed Oct. 17, 2014, the entire contents of which is incorporated herein for all purposes by this reference.

TECHNICAL FIELD

The present disclosure relates generally to a folding vehicle seat having a sufficient passenger walkway space between fixed seats in a bus for passengers to easily move in the bus.

BACKGROUND

A vehicle is provided with seats for passengers to have a comfortable ride on the vehicle. The seats also absorb vibration caused from a road surface when the vehicle is driving.

The number, shape, and size of seats installed in the vehicle are typically determined according to a space defined in a passenger compartment of the vehicle.

Particularly, when a plurality of seats are installed in a small or medium sized bus, a space of a passenger walkway is limited. Due to the insufficient passenger walkway space in the small or medium sized bus, passengers may not easily move to or from the seats when getting on or off the bus.

In the related art, a plurality of fixed seats F and an aisle seat S are installed in a small or medium sized bus, as shown in FIG. 1. Here, to realize the installation of the plurality of seats in the small or medium sized bus, the aisle seat S installed near a passenger walkway P is typically a folding seat.

The folding seat S used as the aisle seat in the small or medium sized bus is exposed to the passenger walkway P, such that the space of the passenger walkway is limited and passengers may not easily move to or from the seats when getting or from the bus.

Further, the conventional folding aisle seat S is mounted on one side of a neighboring fixed seat F using one mounting structure M, such that structural strength of the folding aisle seat S is low. Another problem of the conventional folding aisle seat S resides in that the seat S is not usually provided with a structure for fixing a folded state or an opened state of the folding aisle seat S, so that the seat S may be abruptly inertially opened or closed during a traffic accident and may cause the passengers to get injured.

As described above, in the conventional folding aisle seat installed in a small or medium sized bus, the folding aisle seat disturbs the movement of passengers to or from seats, a mounting structure thereof provides only a low structural strength, and there is no structure for fixing a folded state or an opened state of the folding aisle seat provided, thereby failing to realize passenger safety.

Accordingly, to overcome the above-mentioned problems experienced with the conventional folding aisle seat, an improvement in the structure and function of the folding aisle seat is required.

The foregoing is intended merely to aid in the understanding of the background of the present disclosure, and is not intended to mean that the present disclosure falls within the purview of the related art that is already known to those skilled in the art.

SUMMARY

The present disclosure has been made keeping in mind the above problems occurring in the related art, and the present disclosure is intended to propose a folding vehicle seat, which has a folding structure and which can provide a sufficient space for forming a desired passenger walkway and allowing passengers to easily move to or from seats when getting on or off a vehicle, and which can be firmly installed in the vehicle and is configured such that the folded state and the opened state thereof can be fixed, thereby realizing passenger safety.

In order to achieve the above object, according to one embodiment of the present inventive concept, a folding vehicle seat includes a sliding rail having a predetermined length mounted on a floor of a vehicle. A leg unit is seated on the sliding rail such that the leg unit slides along the sliding rail. A lifting device has a seat cushion on which a passenger sits and is mounted on the leg unit such that the lifting device moves upward and downward, thereby moving the seat cushion upward and downward. A locking device is mounted on the leg unit such that the locking device is connected to both the sliding rail and the lifting device and allows either sliding movement of the leg unit along the sliding rail or upward and downward movement of the lifting device.

The sliding rail may be disposed underneath a fixed seat and extends to one side.

The leg unit may include a panel part on which the lifting device is installed. A sliding part extends downward from the panel part and is seated on the sliding rail.

The lifting device may include a lifting housing mounted on the leg unit. A lifting actuator is installed in the lifting housing and provides an upward and downward moving force. A lifting member is provided in the lifting housing with the seat cushion installed on the lifting member, and the lifting member moves upward and downward by using the upward and downward moving force of the lifting actuator.

The lifting housing may have a guide groove axially extending along an inner circumferential surface of the lifting housing and have a guide protrusion extending along an outer circumferential surface of the lifting member. The guide protrusion may be engaged with the guide groove.

The locking device may include a sliding motion locking part provided on the sliding rail and selectively locked to the sliding rail. A lifting motion locking part is provided on a lower surface of the lifting housing and selectively connected to or disconnected from the lifting member to prevent or allow the upward and downward movement of the lifting member. A manipulation unit is mounted on the leg unit and has a first link connected to the sliding motion locking part and a second link connected to the lifting motion locking part.

The sliding rail may have a sliding groove extending in a length direction of the sliding rail, with a first fixing recess formed in the sliding groove to fix an initial position of the leg unit and have a second fixing recess formed in the sliding groove to fix a moved position of the leg unit, in which the first and second fixing recesses may be spaced apart from each other. The sliding motion locking part may be locked to the first fixing recess or to the second fixing recess during sliding along the sliding groove to fix the sliding motion locking part.

The sliding rail may further include a third fixing recess at an opposite side of the second fixing recess.

The lifting motion locking part may have a circular disc shape such that the lifting motion locking part can rotate based on a center thereof, a plurality of locking holes formed on the lifting motion locking part which are spaced apart from each other in a circumferential direction of the lifting motion locking part. A plurality of locking protrusions may be provided on a lower end of the lifting member such that the locking protrusions are locked to the respective locking holes.

Each of the locking protrusion may have a hook shape being bent after extending downward from the lower end of the lifting member. Each of the locking holes may comprise two parts having different widths to remove the locking protrusions from the respective locking holes when the lifting motion locking part is rotated with the locking protrusions inserted in and locked to the respective locking holes.

Each of the locking protrusions may comprise an extension part that extends downward and a hook part that is bent from a lower end of the extension part. Each of the locking holes may have a small width part into which the extension part is inserted and a large width part into which the hook part is inserted, in which the small width part and the large width part communicate with each other.

The lifting motion locking part may be connected to an elastic member provided on the lower surface of the lifting housing, such that the lifting motion locking part can be returned from a rotated position to an original position thereof.

The manipulation unit may be installed on the leg unit such that the manipulation unit moves inward and outward relative to the leg unit, in which a first end of the manipulation unit is exposed outside the leg unit and a second end of the manipulation unit is connected to both the first link and the second link.

The manipulation unit may be installed on the leg unit such that the manipulation unit can move inward and outward relative to the leg unit. The manipulation unit may include a sliding motion lever part to which the first link is connected. A lifting motion lever part moves along with the sliding motion lever part such that the lifting motion lever part moves by a moving distance longer than a moving distance of the sliding motion lever part during an inward movement thereof. The lifting motion lever part is connected to the second link.

The sliding motion lever part and the lifting motion lever part may have ends exposed outside the leg unit have respective inclined surfaces having the same inclination angle.

The above-mentioned folding vehicle seat of the present disclosure can provide a sufficient space for a passenger walkway and allow passengers to easily move to or from seats when getting on or off a vehicle.

Further, the folding vehicle seat of the present disclosure can be firmly fixed in a folded state and an opened state thereof, thereby realizing passenger safety.

BRIEF DESCRIPTION OF THE DRAWINGS

The above and other objects, features and other advantages of the present disclosure will be more clearly understood from the following detailed description when taken in conjunction with the accompanying drawings.

DETAILED DESCRIPTION

Hereinbelow, a vehicle seat according to an exemplary embodiment of the present inventive concept will be described in detail with reference to the accompanying drawings.

Figure 1:
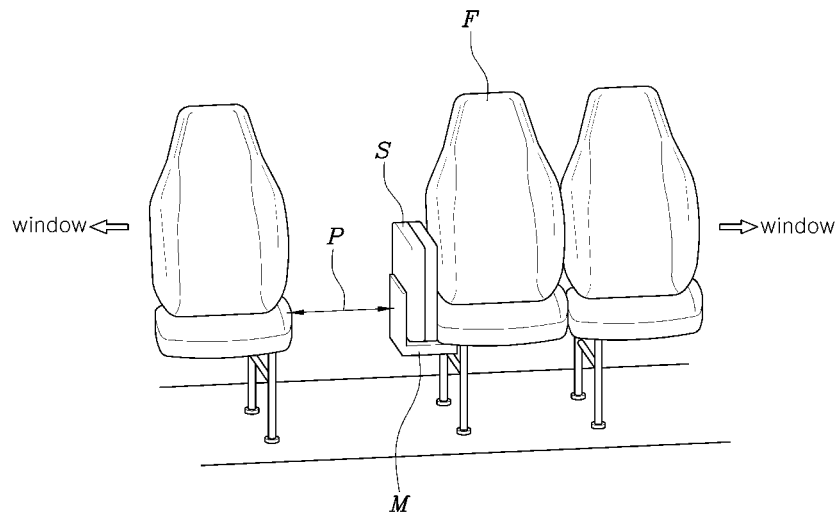
FIG. 1 is a perspective view illustrating vehicle seats installed in a conventional small or medium sized bus.
Figure 2:
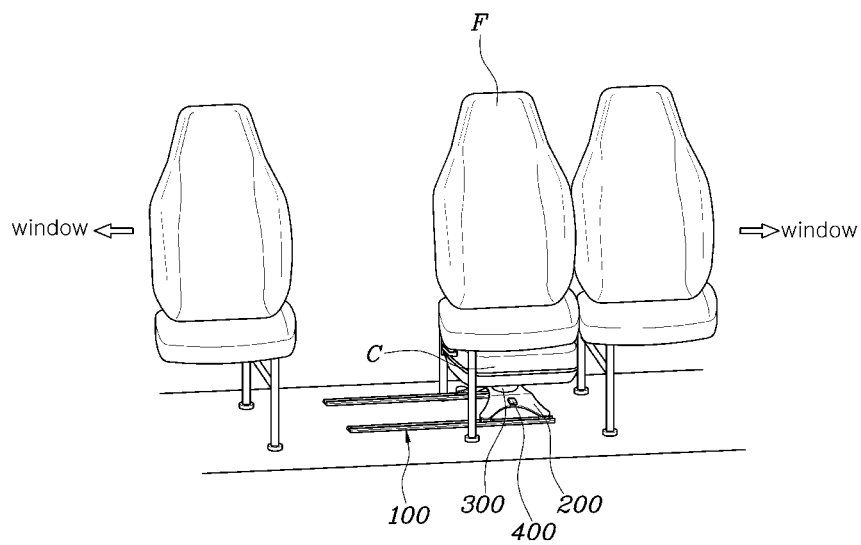
FIG. 2 is a perspective view illustrating a folding vehicle seat according to an embodiment of the present inventive concept.
Figure 3:
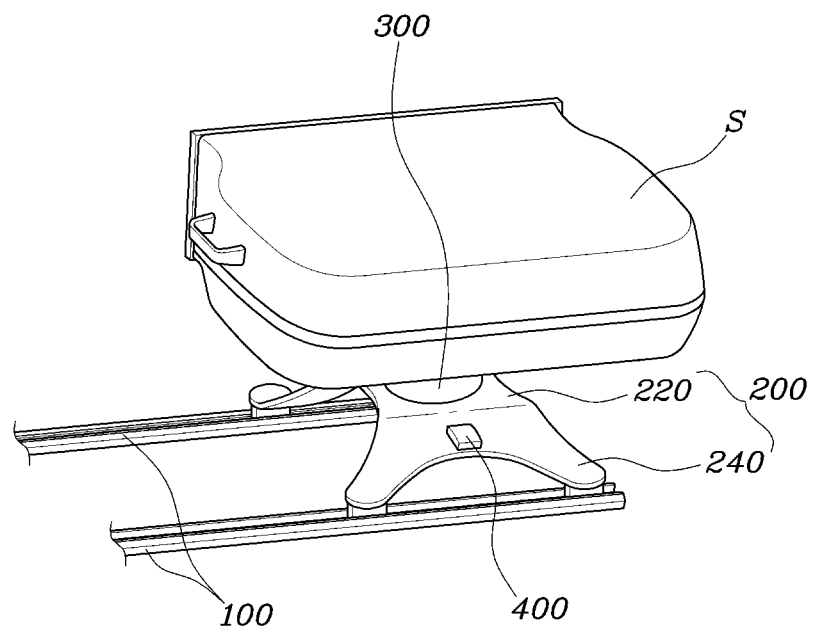
FIG. 3 is an enlarged perspective view of the folding vehicle seat of the present disclosure shown in FIG. 2.
Figure 4:
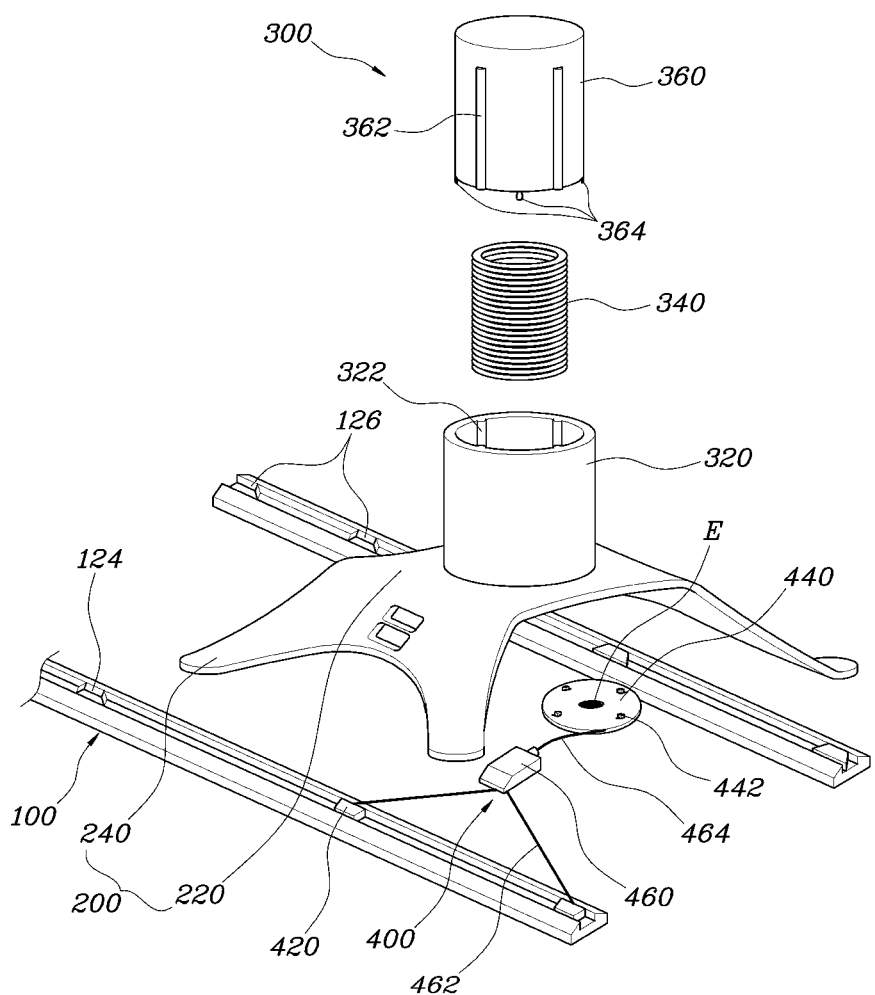
FIG. 4 is an exploded perspective view illustrating the construction of the folding vehicle seat of the present disclosure shown in FIG. 2.

FIG. 2 is a perspective view illustrating a folding vehicle seat according to an embodiment of the present inventive concept. FIG. 3 is an enlarged perspective view of the folding vehicle seat of the present disclosure shown in FIG. 2. FIG. 4 is an exploded perspective view illustrating the construction of the folding vehicle seat of the present disclosure shown in FIG. 2. FIGS. 5 to 13 are views illustrating the operation of the folding vehicle seat shown in FIG. 2.

The folding vehicle seat of the present disclosure has a folding structure and may be used as a folding aisle seat in a small or medium sized bus, in which the aisle seat is a seat installed near a passenger walkway in the bus.

As shown FIGS. 2 and 3, the folding vehicle seat of the present disclosure includes at least one sliding rail 100 extending along a floor in a bus to a predetermined length. A leg unit 200 is seated on the sliding rail 100 such that the leg unit 200 moves along the sliding rail 100 in an extending direction of the sliding rail 100. A lifting device 300 is provided with a seat cushion C on which a passenger sits, the lifting device 300 is combined with the leg unit 200 such that the lifting device 300 moves upward and downward so as to lift or lower the seat cushion C. A locking device 400 is connected to both the sliding rail 100 and the lifting device 300 on the leg unit 200 to selectively allow a sliding movement of the leg unit 200 and an upward and downward movement of the lifting device 300.

In other words, the folding vehicle seat of the present disclosure is installed on the floor in the bus such that the folding vehicle seat can slide along the floor. When the sliding movement of the folding vehicle seat is finished, the seat is lifted or lowered by the lifting device 300 to a desired height at which a passenger can sit comfortably on the folding vehicle seat. Further, the sliding movement of the leg unit 200 or the upward and downward movement of the lifting device 300 is selectively performed by an operation of the locking device 400, so that the folding vehicle seat can be safely operated as desired.

In detail, the sliding rail 100 may extend from a predetermined position below a fixed seat F installed on the floor to one side. That is, because the sliding rail 100 extends from the predetermined position below the fixed seat F to one side, the folding vehicle seat of the present disclosure may slide along the sliding rail 100 to the one side. Here, the sliding rail 100 extends from the predetermined position below the fixed seat F installed near the passenger walkway to the predetermined position on the passenger walkway, so when the folding vehicle seat is not used, the seat in a folded state may be placed below the fixed seat F. When the folding vehicle seat is used, the seat in an opened state may be placed on the passenger walkway.

Further, the leg unit 200 may include a panel part 220 on which the lifting device 300 is provided. The leg unit 200 may further include a sliding part 240 extending downward from the panel part 220 and seated on the sliding rail 100.

In other words, the leg unit 200 includes the panel part 220 and the sliding part 240. Here, on a top of the panel part 220, the lifting device 300 is mounted. The sliding part 240 extends downward from the panel part 220 toward the sliding rail 100 and is seated on the sliding rail 100, so the seat of this invention can slide along the sliding rail 100. In the present disclosure, a plurality of sliding rails 100 may be laid on the floor of the vehicle in such a way that the rails 100 are opposite and parallel to each other. Further, a plurality of sliding parts 240 may extend from the panel part 220, so the leg unit 200 can be firmly installed on the floor of the vehicle and can efficiently support the weight of a passenger sitting on the seat cushion C.

The lifting device 300 may include a lifting housing 320 mounted on the leg unit 200. A lifting actuator 340 is provided in the lifting housing 320 and provides an upward and downward moving force to the lifting device 300. A lifting member 360 is installed in the lifting housing 320, the seat cushion C is installed on the lifting member 360, and the lifting member 360 moves upward and downward by using the upward and downward moving force of the lifting actuator 340.

As shown in FIG. 4, the lifting housing 320 may be a tubular member having a circular cross-section, with the lifting actuator 340 being installed in the lifting housing 320. The lifting actuator 340 provides the upward and downward moving force. In an embodiment, the lifting actuator 340 may be a tension spring. In another embodiment, the lifting actuator 340 may be an air spring.

The seat cushion C is mounted on a top end of the lifting member 360 installed in the lifting housing 320, and the lifting actuator 340 is connected to a lower end of the lifting member 360. Thus, the lifting member 360 can move upward and downward by using the upward and downward moving force of the lifting actuator 340, so the height of the seat cushion C can be adjusted.

When the folding vehicle seat is not used, the seat cushion C may be lowered by the operation of the lifting device 300 such that the height of the seat cushion C can be reduced. However, when it is required to use the folding vehicle seat, the lifting member 360 may be lifted upward in the lifting housing 320 by using the upward and downward moving force of the lifting actuator 340, so the height of the seat cushion C can be adjusted such that a passenger can sit comfortably on the seat cushion C.

Vertical guide grooves 322 may be vertically formed on an inner circumferential surface of the lifting housing 320, and vertical guide protrusions 362 may be formed on the outer circumferential surface of the lifting member 360 such that the guide protrusions 362 can be movably engaged with the guide grooves 322 of the lifting housing 320.

Due to the movable engagement of the guide grooves 322 formed on the inner circumferential surface of the lifting housing 320 with the guide protrusions 362 formed on the outer circumferential surface of the lifting member 360, the guide protrusions 362 of the lifting member 360 can efficiently move upward and downward along the guide grooves 322 of the lifting housing 320 during the upward and downward movement of the lifting actuator 340, so the lifting member 360 can efficiently move upward and downward without rotating inside of the lifting housing 320.

The locking device 400 includes a sliding motion locking part 420 provided on the sliding rail 100 so as to be selectively locked to the sliding rail 100. A lifting motion locking part 440 is provided on the lower surface of the lifting housing 320 so as to be selectively connected to or disconnected from the lifting member 360, thereby preventing or allowing the upward and downward movement of the lifting member 360. A manipulation unit 460 is installed on the leg unit 200 and has a first link 462 connected to the sliding motion locking part 420 and a second link 464 connected to the lifting motion locking part 440.

In other words, the locking device 400 includes the sliding motion locking part 420 that can selectively allow the sliding movement of the leg unit 200 and the lifting motion locking part 440 that can selectively allow an upward and downward movement of the lifting member 360. Here, the locking or unlocking operation of both the sliding motion locking part 420 and the lifting motion locking part 440 may be performed by manipulating the manipulation unit 460.

Described in detail, as shown in FIGS. 5 to 8, the sliding rail 100 is provided with a sliding groove 120 extending in an axial direction of the sliding rail 100. The sliding groove 120 is provided with a first fixing recess 122 for fixing an initial position of the leg unit 200 and a second fixing recess 124 for fixing a moved position of the leg unit 200, in which the first and second fixing recesses 122 and 124 are formed at locations spaced apart from each other. Here, the sliding motion locking part 420 is locked to the first fixing recess 122 or to the second fixing recess 124 during a sliding movement thereof along the sliding groove 120. In the present disclosure, the sliding motion locking part 120 may have a bearing structure.

Described in detail, the sliding groove 120 is formed on the sliding rail 100 in such a way that the sliding groove 120 extends along the axial direction of the sliding rail 100. Here, the sliding motion locking part 420 is movably seated in the sliding groove 120 so that the sliding motion locking part 420 can move along the sliding rail 100. Further, the sliding groove 120 is provided with both the first fixing recess 122 for fixing the initial position of the leg unit 200 and the second fixing recess 124 for fixing the moved position of the leg unit 200, so the leg unit 200 may be fixed to the initial position or the moved position according to an engagement of the sliding motion locking part 420 with the first fixing recess 122 or the second fixing recess 124.

The sliding motion locking part 420 is connected to the first link 462 of the manipulation unit 460, thus, when manipulation force is applied the manipulation unit 460, the sliding motion locking part 420 escapes from the first fixing recess 122 or the second fixing recess 124 and can move along the sliding groove 120. Here, when the manipulation force is removed from the manipulation unit 460, the manipulation unit 460 is elastically returned to an original position thereof by a restoring force of an elastic member E that is connected to the lifting motion locking part 440 and will be described later herein. Thus, the sliding motion locking part 420 is locked to the first fixing recess 122 or to the second fixing recess 124.

The sliding rail 100 may further include a third fixing recess 126 at a location opposite to and facing the second fixing recess 124. In the present disclosure, the manipulation unit 460 is connected to the sliding motion locking part 420 via the first link 462 and to the lifting motion locking part 440 via the second link 464, so the sliding motion locking part 420 and the lifting motion locking part 440 may be actuated at the same time in response to an operation of the manipulation unit 460. In other words, when the lifting device 300 moves upward and downward, the sliding motion locking part 420 moves from the second fixing recess 124 to the third fixing recess 126 and is fixed in the third fixing recess 126, such that the upward and downward movement of the lifting device 300 can be efficiently performed. This function will be described in detail later herein.

Further, as shown in FIGS. 9 to 12, the lifting motion locking part 440 has a circular disc shape such that the disc-shaped lifting motion locking part 440 can rotate based on a center thereof. Here, a plurality of locking holes 442 are formed through the disc-shaped lifting motion locking part 440 at respective locations spaced apart from each other in a circumferential direction of the disc-shaped lifting motion locking part 440. Further, a plurality of locking protrusions 364 are provided on the lower end of the lifting member 360 such that the locking protrusions 364 is locked to the respective locking holes 442.

In other words, the second link 464 extending from the manipulation unit 460 is connected to the lifting motion locking part 440 which has the circular disc shape, such that, when the manipulation unit 460 is manipulated and the manipulation force thereof is applied to the lifting motion locking part 440 via the second link 464, the lifting motion locking part 440 rotates based on the center thereof. The second link 464 of the manipulation unit 460 may be connected to the edge of the lifting motion locking part 440.

As described above, the lifting motion locking part 440 is provided with the locking holes 442 and the lifting member 360 is provided with the locking protrusions 364 that may be locked to the respective locking holes 440. Thus, during a normal state, the locking protrusions 364 are locked to the respective locking holes 442, thereby fixing a position of the lifting member 360. However, when the lifting motion locking part 440 rotates, the locking protrusions 364 can be removed from the respective locking holes 442, thereby allowing an upward and downward movement of the lifting member 360.

Figure 11:
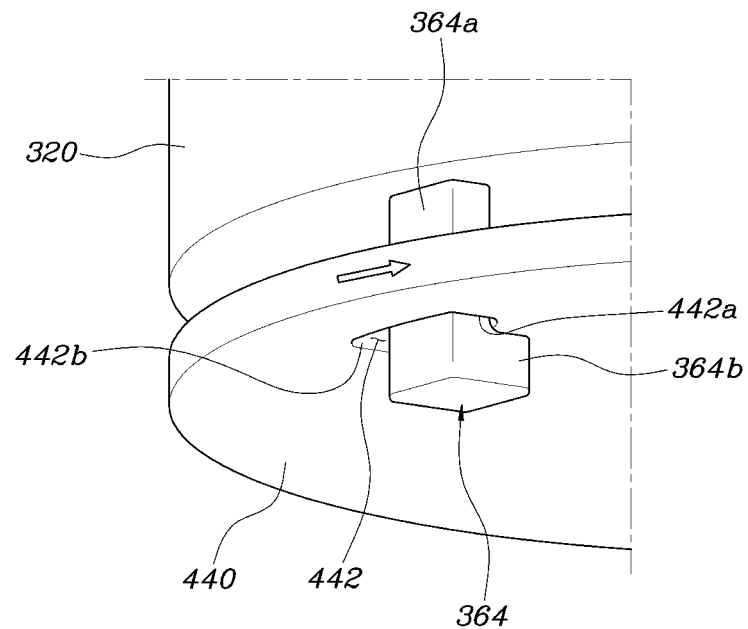
Figure 12:
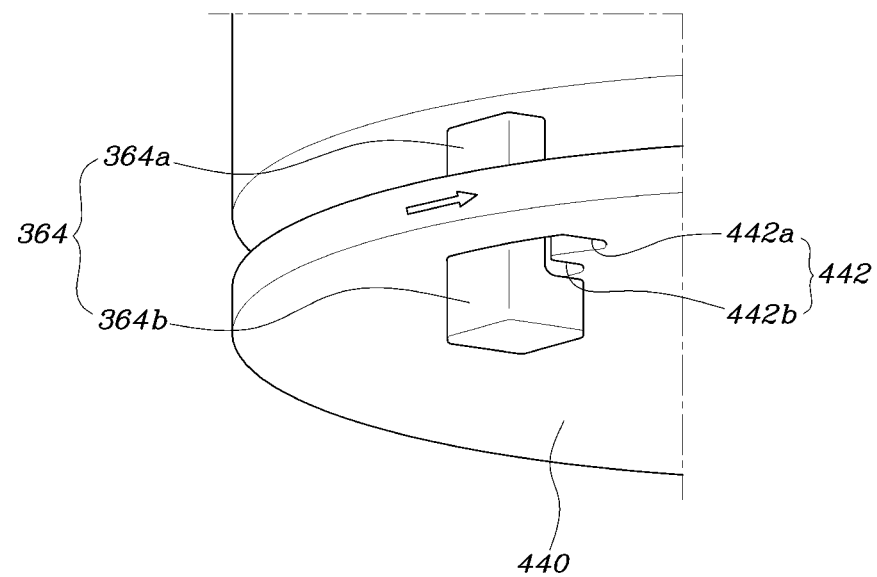

That is, as shown in FIGS. 11 and 12, each of the locking protrusions 364 has a hook shape that is bent after extending downward from the lower end of the lifting member 360, and each of the locking holes 442 has two parts with different widths. Thus, when the lifting motion locking part 440 rotates in a direction shown by the arrow shown in FIGS. 11 and 12 with the locking protrusions 364 inserted in and locked to the respective locking holes 442, the locking protrusions 364 can be removed from the respective locking holes 442.

That is, each of the locking protrusions 364 comprises an extension part 364a that extends downward and a hook part 364b that is bent from the lower end of the extension part 364a. Further, each of the locking holes 442 is composed of a small width part 442a into which the extension part 364a is inserted and a large width part 442b into which the hook part 364b is inserted. Here, the small width part 442a and the large width part 442b communicate with each other.

In other words, each of the locking protrusions 364 of the lifting member 360 includes the extension part 364a and the hook part 364b, in which a radial thickness of the hook part 364b is larger than a radial thickness of the extension part 364a. Further, according to each of the locking holes 442 of the lifting motion locking part 440, the small width part 442a, into which the extension part 364a can be inserted, communicates with the large width part 442b into which the hook part 364b can be inserted. Thus, during an initial stage of the upward and downward movement of the lifting member 360, the hook parts 364b of the locking protrusions 364 are caught in the small width parts 442a of the respective locking holes 442 into which only the extension parts 364a can be inserted, thereby fixing the position of the lifting member 360. However, when the lifting motion locking part 440 rotates from this position and the locking protrusions 364 are placed in the large width parts 442b of the respective locking holes 442 into which the hook parts 364b can be inserted, the locking protrusions 364 of the lifting member 360 can be removed from the respective locking holes 442, thereby allowing an upward and downward movement of the lifting member 360.

The lifting motion locking part 440 is connected to the elastic member E provided on the lower surface of the lifting housing 320, such that the lifting motion locking part 440 can be returned from a rotated position to an original position thereof.

That is, the lifting motion locking part 440 is configured such that the lifting motion locking part 440 can return from a rotated position to its original position by the elastic member E. When the manipulation force is removed from the manipulation unit 460, the lifting motion locking part 440 elastically returns from the rotated position to the original position thereof, and the sliding motion locking part 420 can be fixed in a fixing recess.

In the present disclosure, the elastic member E may be a circular spring such that, when a manipulation force is applied to the manipulation unit 460, the elastic member E generates an elastic restoring force acting in an opposite direction of movement of the first link 462 and the second link 464.

Further, the manipulation unit 460 installed on the leg unit 200 such that the manipulation unit 460 can move inward and outward relative to the leg unit 200. Here, a first end of the manipulation unit 460 may be exposed outside the leg unit 200 and a second end thereof may be connected to both the first link 462 and the second link 464.

When a manipulation force or a pushing force is applied to the exposed first end of the manipulation unit 460, the manipulation unit 460 moves inwardly, and both the first link 462 and the second link 464 connected to the second end of the manipulation unit 460 move, thereby actuating both the sliding motion locking part 420 and the lifting motion locking part 440.

The manipulation unit 460, which is installed on the leg unit 200 such that the manipulation unit 460 can move inward and outward relative to the leg unit 200, may include a sliding motion lever part 460a to which the first link 462 is connected. A lifting motion lever part 460b is arranged to move along with the sliding motion lever part 460a in such a way that the lifting motion lever part 460b move by a moving distance longer than a moving distance of the sliding motion lever part 460a during an inward movement thereof. The lifting motion lever part 460b is connected to the second link 464.

When a manipulation force is applied to the sliding motion lever part 460a of the manipulation unit 460, the first link 462 moves and the sliding motion locking part 420 is released from a fixed position, thereby allowing a sliding movement of the leg unit 200. In this case, although both the first link 462 and the second link 464 move together, only the sliding motion locking part 420 is released from the fixed position.

When the manipulation force is applied to the lifting motion lever part 460b after the leg unit 200 stops sliding, the second link 464 is further moved from a position accomplished when manipulating the sliding motion lever part 460a, so the lifting motion locking part 440 is released from a fixed position. Here, in this case, although both the first link 462 and the second link 464 move together, the sliding motion locking part 420 moves from the second fixing recess 124 of the sliding rail 100 to the third fixing recess 126 formed at a location opposite to and facing the second fixing recess 124, thereby allowing an upward and downward movement of the lifting member 360 while restricting the sliding movement of the leg unit 200.

Here, ends of both the sliding motion lever part 460a and the lifting motion lever part 460b are exposed outside the leg unit 200 and have respective inclined surfaces having the same inclination angle. Thus, although the same manipulation force is applied to both the sliding motion lever part 460a and the lifting motion lever part 460b, the sliding motion lever part 460a and the lifting motion lever part 460b can move inward or outward by different distances.

The folding vehicle seat of the present disclosure will be operated as follows. As shown in FIG. 2, in an initial stage, the leg unit 200 is placed below a fixed seat F. In this case, the sliding motion locking part 420 of the locking device 400 installed on the leg unit 200 is caught in the first fixing recess 122 formed in the sliding groove 120 of the sliding rail 100, and a position of the leg unit 200 is fixed.

Figure 5:
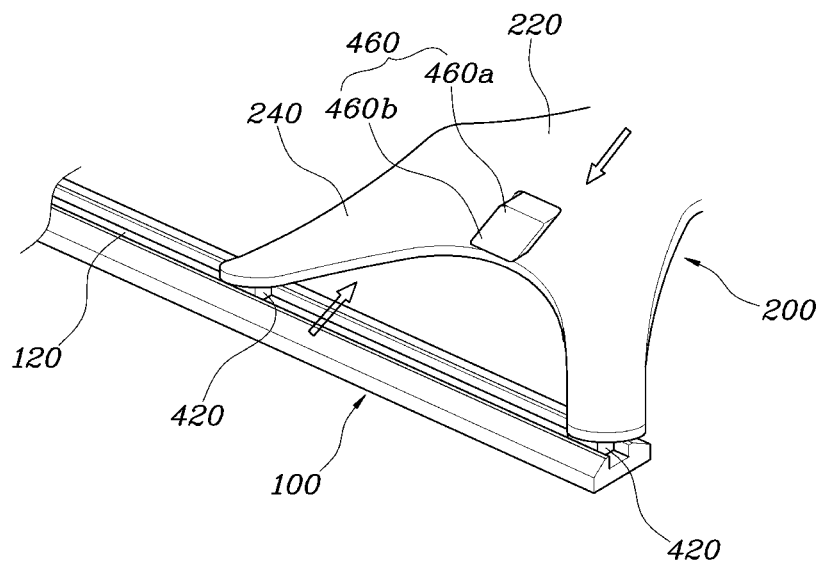
FIGS. 5 to 13 are views illustrating the operation of the folding vehicle seat shown in FIG. 2.
Figure 6:
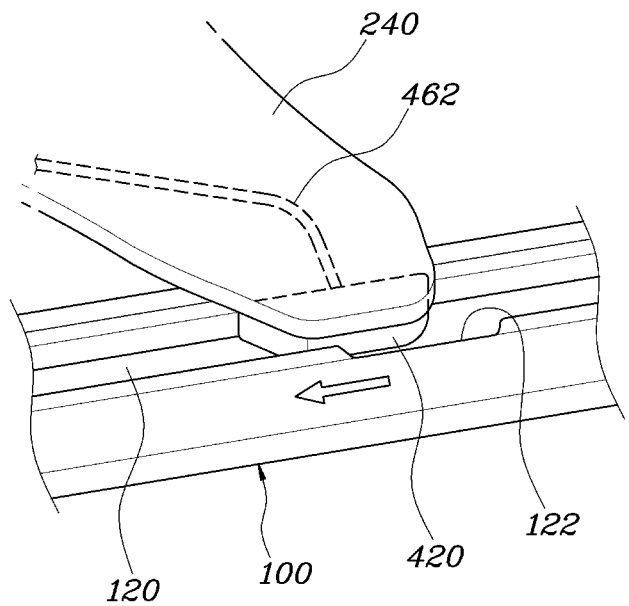
Figure 7:
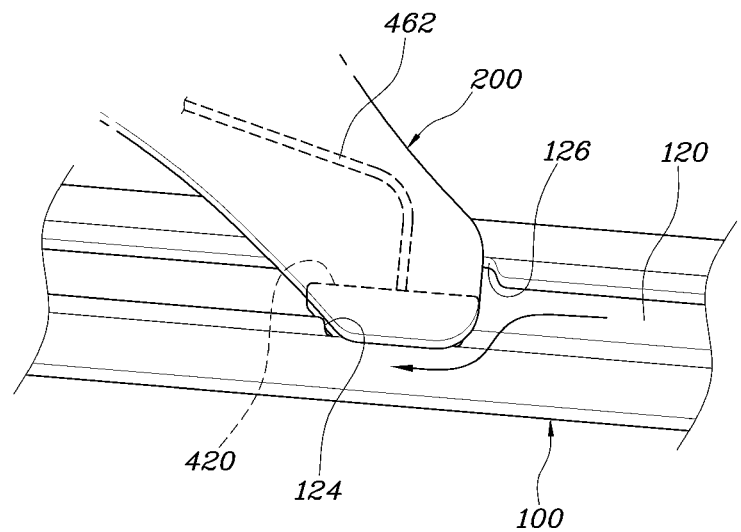

To use the folding vehicle seat of the present disclosure, a user or a passenger applies a manipulation force to the sliding motion lever part 460a of the manipulation unit 460, as shown in FIG. 5, and then, the manipulation unit 460 moves inward. Due to the inward movement of the manipulation unit 460, the first link 462 moves and the sliding motion locking part 420 escapes from the first fixing recess 122, so the sliding motion locking part 420 can move along the sliding groove 120 of the sliding rail 100 until it reaches a desired position. When the sliding motion locking part 420 escapes from the first fixing recess 122 and moves along the sliding groove 120 of the sliding rail 100 until it reaches the second fixing recess 124, the leg unit 200 is moved from a position below the fixed seat F to a position on a passenger walkway.

When the sliding motion locking part 420 reaches the second fixing recess 124, the sliding motion locking part 420 is inserted into the second fixing recess 124 by the elastic restoring force of the elastic member E provided in the lifting housing 320 to fix the position of the sliding motion locking part 420. In other words, the first link 462 connected to the sliding motion locking part 420 and the second link 464 connected to the lifting motion locking part 440 are configured such that the two locking parts 420 and 440 move together when the manipulation unit 460 is manipulated. Further, the lifting motion locking part 440 connected to the second link 464 is returned to the original position by the elastic member E, and thus, when the first link 462 is returned to an original position thereof, the sliding motion locking part 420 is inserted into the second fixing recess 124.

Figure 8:
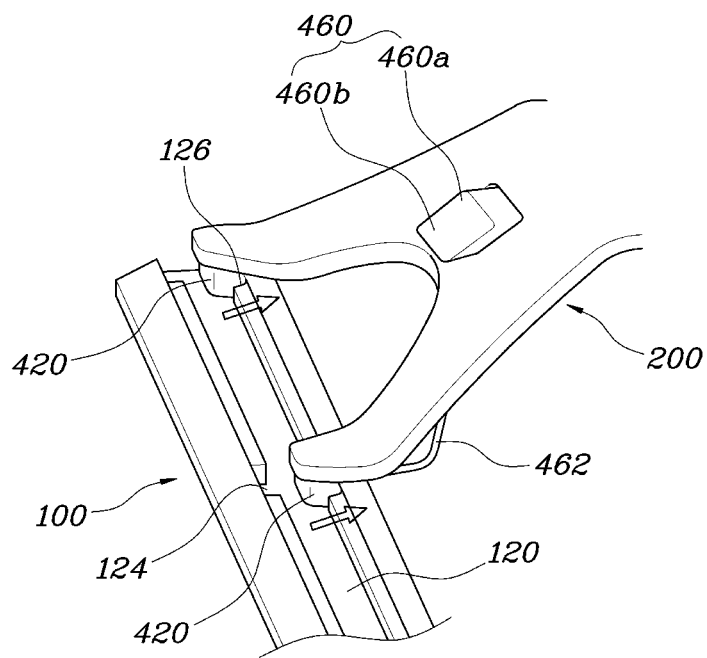
Figure 9:
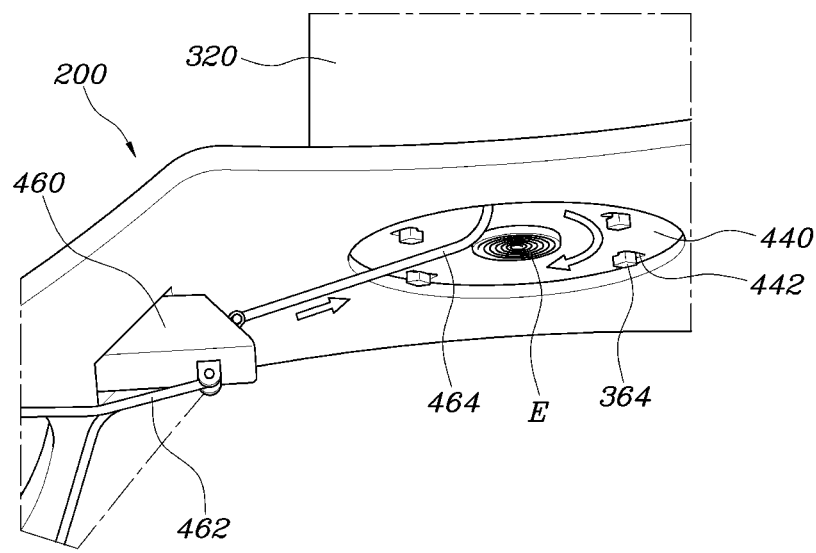

When a manipulation force is applied to the lifting motion lever part 460b of the manipulation unit 460 in the above state, the manipulation unit 460 moves inwardly. In this case, the manipulation unit 460 further moves from the position accomplished when manipulating the sliding motion lever part 460b. Accordingly, the sliding motion locking part 420 moves from the second fixing recess 124 to the third fixing recess 126 as shown in FIG. 8 and is fixed at the third fixing recess 126. Further, the lifting motion locking part 440 can rotate as shown in FIG. 9.

Figure 10:
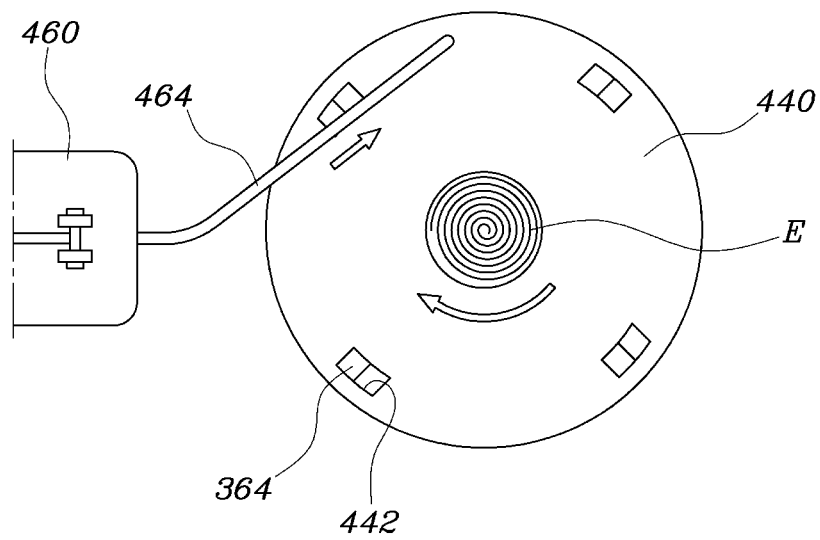

Due to the rotation of the lifting motion locking part 440, the locking holes 442 also rotate in the same direction. When the locking protrusions 364 of the lifting member 360 are placed in the large width parts 442b of the respective locking holes 442 of the lifting motion locking part 440 during the rotation of the locking holes 442, as shown in FIGS. 9 and 10, the locking protrusions 364 of the lifting member 360 can remove from the respective locking holes 442.

Figure 13:
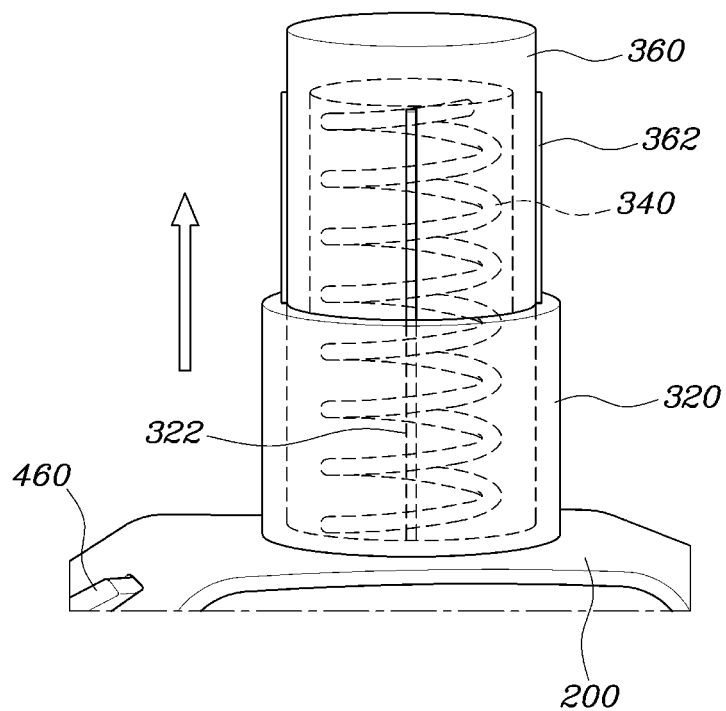

Thus, the lifting member 360 is moved upward by the upward and downward moving force of the lifting actuator 340 as shown in FIG. 13, and thus, it is possible to adjust the height of the seat cushion C to a level at which a passenger can sit on the seat cushion C comfortably.

As described above, the present disclosure provides a folding vehicle seat, which has a folding structure and can provide a sufficient space for a desired passenger walkway space and allowing passengers to easily move to or from seats when getting on or off a vehicle, and which can be firmly installed in the vehicle in a folded state and an opened state thereof, thereby improving passenger safety.

Although an exemplary embodiment of the present inventive concept has been described for illustrative purposes, those skilled in the art will appreciate that various modifications, additions, and substitutions are possible, without departing from the scope and spirit of the invention as disclosed in the accompanying claims.

What is claimed is:
1. A folding vehicle seat, comprising:
   a sliding rail having a predetermined length and mounted on a floor of a vehicle;
   a leg unit seated on the sliding rail to slide along the sliding rail;
   a lifting device having a seat cushion on which a passenger sits, the lifting device mounted on the leg unit such that the lifting device moves upward and downward and the seat cushion moves upward and downward; and
   a locking device mounted on the leg unit and connected to both the sliding rail and the lifting device to allow sliding movement of the leg unit along the sliding rail or upward and downward movement of the lifting device,
   wherein the lifting device includes:
   a lifting housing mounted on the leg unit;
   a lifting actuator installed in the lifting housing and providing an upward and downward moving force; and
   a lifting member provided in the lifting housing, with the seat cushion attached on the lifting member, the lifting member moving upward and downward by using the upward and downward moving force of the lifting actuator.

2. The folding vehicle seat of claim 1, wherein the sliding rail is mounted on the floor underneath a fixed seat and extends to one side.

3. The folding vehicle seat of claim 1, wherein the leg unit includes:
   a panel part on which the lifting device is installed; and
   a sliding part extending downward from the panel part and seated on the sliding rail.

4. The folding vehicle seat of claim 1, wherein the lifting housing has a guide groove axially extending along an inner circumferential surface of the lifting housing, and the lifting member has a guide protrusion extending along an outer circumferential surface of the lifting member, the guide protrusion being engaged with the guide groove.

5. The folding vehicle seat of claim 1, wherein the locking device includes:
   a sliding motion locking part provided on the sliding rail and selectively locked to the sliding rail;
   a lifting motion locking part provided on a lower surface of the lifting housing and selectively connected to or disconnected from the lifting member to prevent or allow the upward and downward movement of the lifting member; and a manipulation unit mounted on the leg unit and having a first link connected to the sliding motion locking part and a second link connected to the lifting motion locking part.

6. The folding vehicle seat of claim 5, wherein
the sliding rail has a sliding groove extending in a length direction of the sliding rail, a first fixing recess formed in the sliding groove to fix a first position of the leg unit, and a second fixing recess formed in the sliding groove to fix a second position of the leg unit, in which the first and second fixing recesses are spaced apart from each other, and wherein the sliding motion locking part is locked to the first fixing recess or to the second fixing recess during sliding along the sliding groove, thus fixing the sliding motion locking part.

7. The folding vehicle seat of claim 6, wherein the sliding rail further includes a third fixing recess at an opposite side of the second fixing recess.

8. The folding vehicle seat of claim 5, wherein
the lifting motion locking part has a circular disc shape such that the lifting motion locking part rotates based on a center thereof, a plurality of locking holes formed on the lifting motion locking part and spaced apart from each other in a circumferential direction of the lifting motion locking part, and a plurality of locking protrusions are provided on a lower end of the lifting member such to fix locking protrusions to the respective locking holes.

9. The folding vehicle seat of claim 8, wherein
each of the locking protrusions has a hook shape and being bent after extending downward from the lower end of the lifting member, and each of the locking holes comprises two parts with different widths to remove the locking protrusions from the respective locking holes when the lifting motion locking part rotates with the locking protrusions which are inserted in and locked to the respective locking holes.

10. The folding vehicle seat of claim 9, wherein
each of the locking protrusions comprises an extension part extending downward and a hook part being bent from a lower end of the extension part, and each of the locking holes has a small width part into which the extension part is inserted and a large width part into which the hook part is inserted, in which the small width part and the large width part communicate with each other.

11. The folding vehicle seat of claim 5, wherein the lifting motion locking part is connected to an elastic member provided on the lower surface of the lifting housing, such that the lifting motion locking part returns from a rotated position to an original position thereof.

12. The folding vehicle seat of claim 5, wherein the manipulation unit is mounted on the leg unit and moves inward and outward from the leg unit, in which a first end of the manipulation unit is exposed outside the leg unit and a second end of the manipulation unit is connected to both the first link and the second link.

13. The folding vehicle seat of claim 5, wherein
the manipulation unit is mounted on the leg unit and moves inward and outward from the leg unit, the manipulation unit including:

a sliding motion lever part to which the first link is connected; and a lifting motion lever part moving along with the sliding motion lever part such that the lifting motion lever part moves by a moving distance longer than a moving distance of the sliding motion lever part during an inward movement thereof, the lifting motion lever part being connected to the second link.

14. The folding vehicle seat of claim 13, wherein each end of the sliding motion lever part and the lifting motion lever part is exposed outside the leg unit and has a respective inclined surface at the same inclination angle.

* * * * *